United States Patent [19]

Onozato

[11] Patent Number: 4,956,652
[45] Date of Patent: Sep. 11, 1990

[54] PEN SELECTION MECHANISM FOR A PRINTER

[75] Inventor: Takashi Onozato, Morioka, Japan

[73] Assignee: Alps Electric Co., Ltd., Tokyo, Japan

[21] Appl. No.: 325,313

[22] Filed: Mar. 17, 1989

Related U.S. Application Data

[62] Division of Ser. No. 98,542, Sep. 18, 1987, Pat. No. 4,845,516.

[30] Foreign Application Priority Data

Dec. 1, 1986 [JP] Japan ................................ 61-183730
Dec. 1, 1986 [JP] Japan ................................ 61-183731
Dec. 11, 1986 [JP] Japan ................................ 61-293496
Dec. 12, 1986 [JP] Japan ................................ 61-296348

[51] Int. Cl.$^5$ ............................................ G01D 9/30
[52] U.S. Cl. .................................. 346/139 R; 346/46; 346/49

[58] Field of Search ............... 346/139 R, 49, 46, 141, 346/29

[56] References Cited

U.S. PATENT DOCUMENTS 4,578,685 3/1986 Tanaka et al. .................... 346/139 R Primary Examiner—Mark J. Reinhart
Attorney, Agent, or Firm—Guy W. Shoup; Norman R. Klivans

[57] ABSTRACT

A pen exchange mechanism is disclosed, by which a plurality of pen chuck mechanisms holding pens on a carriage are disposed, and a slider is engaged with the carriage at a position corresponding to a pen, which should print, among said pens, printing being effected while driving a pen chuck mechanism at a position corresponding to the slider together with the pen by means of a pen driving mechanism.

1 Claim, 5 Drawing Sheets

PEN SELECTION MECHANISM FOR A PRINTER

This application is a division of U.S. Pat. No. 4,845,516 application Ser. No. 07/098,542, filed Sept. 18, 1987.

FIELD OF THE INVENTION

This invention relates to a pen type printer utilized in a printer effecting printing etc. by means of pens.

BACKGROUND OF THE INVENTION

In general, there are printers having a construction by which printing etc. are effected by means of pens, which are a kind of device outputting various sorts of information.

A printer using these pens is so constructed that pen chuck mechanisms are mounted on a carriage moving relatively with respect to a surface to be printed, a plurality of pens having different colors are mounted on these pen chuck mechanisms, respectively, and printing is effected by selecting a pen having a color to be printed so that color printing can be easily effected.

However, in a printer using conventional pens, printing etc. is effected by using special pens prepared separately for each model of printers and it was not possible to effect printing etc. by means of pens sold in the market. Of course, it was not possible to select freely the nature of the ink and the size of printed letters. Further, by a prior art printer printing etc. only of colors previously prepared can be effected and it is impossible to effect printing of a color selected freely among color pens sold in the market. In addition, according to the prior art techniques, since every pen was formed to be small in order to mount a plurality of pens on a pen chuck mechanism, the amount of ink was small, ink was often exhausted in the course of a printing etc., which obliged exchange of the pens. Furthermore it was feared that discontinuity was produced in the print due to the exchange of pens.

OBJECT OF THE INVENTION

This invention takes these points into account and its object is to provide a cheap pen type printer of simple construction permitting change-over of pens used for the printing etc. in a simple manner, in the case where the printing etc. is effected by using various pens different in thickness, length, form, etc.

SUMMARY OF THE INVENTION

A pen exchange mechanism according to this invention comprises a carriage moving relatively and parallel with respect to a suface to be printed; a plurality of pen chuck mechamisms supported by the carriage freely movably in the direction perpendicular to the surface to be printed together with pens held thereon; a slider mounted movably relatively between driving positions corresponding to the pen chuck mechanisms with respect to the carriage and at the driving positions engaged with the carriage in one body; and a pen driving mechanism disposed on the slider so as to drive a corresponding pen chuck mechanism towards the surface to be printed at each of the driving positions.

By the pen exchange mechanism according to this invention a plurality of pen chuck mechanisms are disposed and a slider is engaged with the carriage at a driving position corresponding to a pen, which is printing, among these pens. In this state printing etc. is effected by driving a pen chuck mechanism, which is at a position corresponding to the slider together with a pen, by means of a pen driving mechanism and by thrusting the pen against a surface to be printed.

Next, in the case where the pen effecting printing etc. should be exchanged, the slider at the driving position corresponding to the pen used at that time is disengaged from the carriage so that both the members are put in a state where they are freely movable with respect to each other. After that, the slider is moved to a relative driving position corresponding to a pen, which should be used subsequently, with respect to the carriage, and the slider and the carriage are engaged with each other at that position. In this way an exchange of a used pen to a new one which should be used for printing is terminated. The new pen is driven by the pen driving mechanism thereafter in order to effect printing etc.

A pen chuck mechanism according to this invention comprises a sleeve supported by a carriage moving relatively and parallel with respect to a suface to be printed freely movably in the direction perpendicular to the surface to be printed; and a plurality of holding nails disposed on the sleeve, a pen being able to be inserted and extracted in and from the space surrounded by the holding nails in the direction perpendicular to the surface to be printed and to be held by them elastically.

By the pen chuck mechanism according to this invention it is possible to hold e.g. any one of various pens sold in the market while effecting correct centering of the nib of the pen by an extremely simple operation to thrust a pen with the nib directed towards the surface to be printed in the space surrounded by the holding nails disposed on the sleeve.

That is, the pen is held by the elasticity of the holding nails. In addition, since the holding force of the holding nails is stronger at the extremity on the side of the surface to be printed than at the extremity on the other side, the centering of the nib of the pen can be effected correctly and at the same time a pen, which is tapered to be more and more slender towards the nib of the pen, is held with a force sufficiently strong.

Consequently printing etc. can be effected with a pen arbitrarily selected, depending on the purpose such as printing etc.

A pen position regulating mechanism according to this invention, in which a pen is held by a pen chuck mechanism holding the pen inserted towards a surface to be printed and freely movable in the direction perpendicular to the surface to be printed so that the extremity thereof is in accordance with a mounting reference position predetermined therefor, is characterized in that it comprises further a simultaneous movement distance regulating member, which regulates the distance over which the pen chuck mechanism can move towards the surface to be printed at the same time as the pen, when the pen is inserted in the pen chuck mechanism, and a separate movement distance regulating member, which regulates the distance over which the pen can move alone in the same direction after the pen chuck mechanism has been stopped.

In the pen position regulating mechanism according to this invention, when a pen is inserted towards the surface to be printed into a pen chuck mechanism, both the pen and the pen chuck mechanism move at the same time towards the surface to be printed by friction. Then, when they move at the same time to some extent, the movement towards the surface to be printed of one of them, i.e. the pen chuck mechanism, is prevented by the simultaneous movement distance regulating member. After that, when the pen is further thrusted, only the pen continues to be thrusted towards the surface to be printed. When only the pen is advanced to some extent, the displacement of the pen alone is also prevented by the separate movement distance regulating member. In this state, when the thrusting force on the pen is removed, the pen and the pen chuck mechanism return together by the distance, over which the pen chuck mechanism has been displaced. This return distance is constant for any pen, because it is always the distance regulated by the simultaneous movement distance regulating member. Consequently the pen is mounted in a state where the nib of the pen is held always at a constant height from the surface to be printed, i.e. it is in accordance with the mounting reference position in the pen chuck mechanism.

A printing method according to this invention comprises the steps of forming a plurality of pen chuck mechanisms holding pens freely movable up and down on a carriage moving parallel and relatively to a surface to be printed; forming position correcting means displacing and regulating the carriage and a sheet of paper to be printed in two directions, which are perpendicular to each other, in order to position a specified pen on the pen chuck mechanism at a predetermined printing position, and disposing a memory storing change-over strokes for changing-over the pens in the position correcting means, the displacement and the regulation of the carriage and the sheet of paper being controlled by the memory.

By the printing method according to this invention, since the position correcting means regulating the displacement of the carriage and the sheet of paper and positioning a specified pen at its initial position includes a memory storing change-over strokes for changing-over the pens, even if the pen, which should print, has been changed, the newly mounted pen can move correctly to the predetermined position therefor and therefore it is possible to print with various colors by means of a plurality of pens having a large size.

DETAILED DESCRIPTION

Hereinbelow some preferred embodiments of this invention will be explained more in detail, referring to FIGS. 1 to 10.

Figure 1:
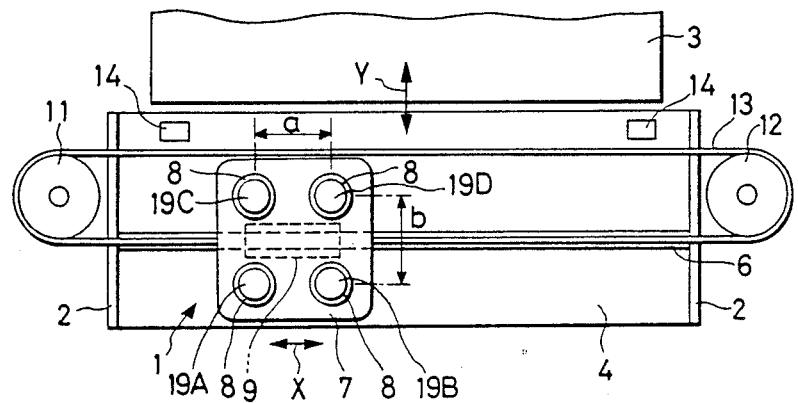
FIG. 1 is a plan view of a whole printer according to an embodiment of this invention.
Figure 2:
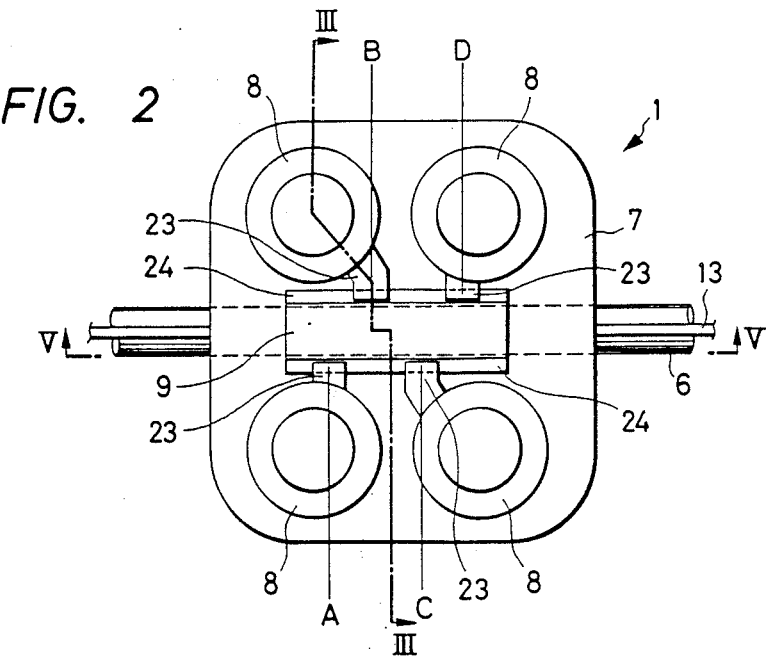
FIG. 2 is an enlarged plan view of the carriage and the slider of the printer indicated in FIG. 1.
Figure 3:
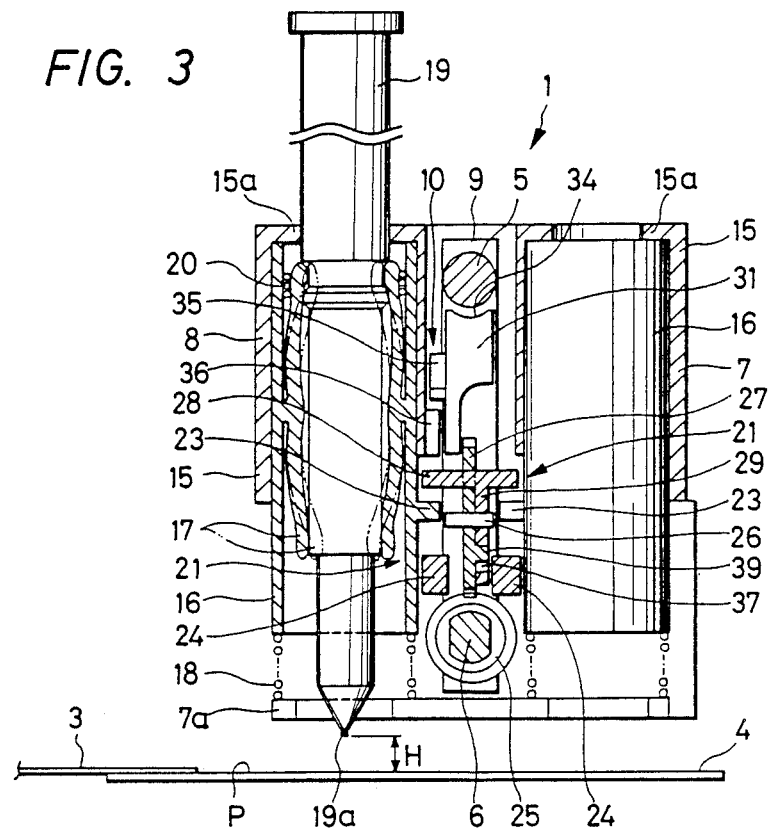
FIG. 3 is a cross-sectional view along the III—III line in FIG. 2.
Figure 4:
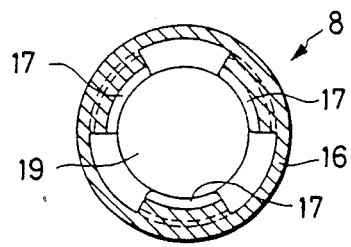
FIG. 4 is a transversal plan view of a pen chuck mecanism of the printer indicated in FIG. 1.
Figure 5:
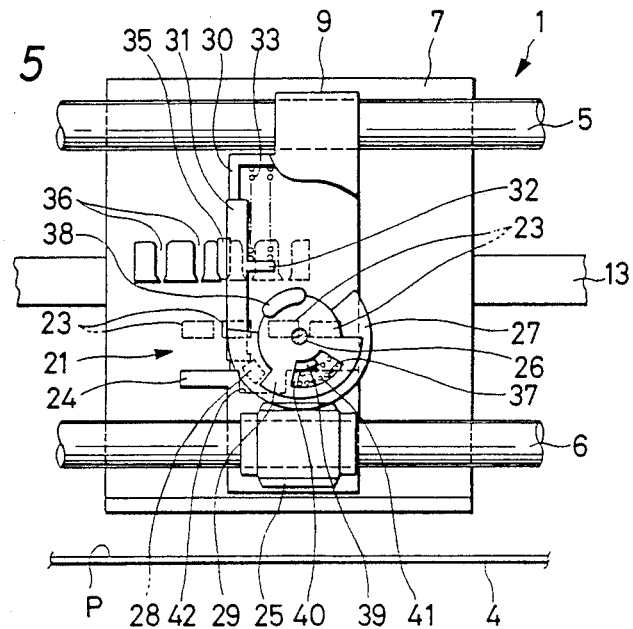
FIG. 5 is a cross-sectional view along the II—II line in FIG. 2.

At first, an approximate construction of a printer using a pen exchange mechanism 1, which is an embodiment of this invention, will be explained. In the printer of this embodiment, as indicated in FIGS. 1 and 3, a base plate 4, to the upper surface of which a sheet of paper 3 is supplied between frames 2, 2 disposed fixedly at the two extremities in the width direction, is arranged horizontally. Hereinbelow the upper surface of this base plate 4 is called the surface to be printed. Above this base plate 4 an upper fixed shaft 5 and a lower rotational shaft 6 are transversally mounted parallel to each other. A carriage 7, on which 4 pen chuck mechanisms 8, 8, . . . driven selectively by the pen exchange mechanism 1 of this embodiment are disposed, is mounted on fixed shaft 5 and rotational shaft 6 freely slidably in the axial direction by a bearing not shown in the figure. Further within the carriage 7 is disposed a slider 9, which is mounted on the two shafts 5 and 6 freely slidably in the axial direction by a bearing not shown in the figure in the same way as the carriage 7. In addition, this slider 9 and the carriage 7 can be engaged with each other in one body through an engaging mechanism 10 so that they can move together or separately with respect to each other. Furthermore the two extremities of a carriage driving cord 13 such as a belt wound round a driving wheel 11 and a driven wheel 12 disposed on the outer side of the frames 2, respectively, are fixed to the two extremities of the carriage 7 in the axial direction. When the slider 9 and the carriage 7 are engaged in one body with each other through the engaging mechanism 10, they are driven forward and backward in the axial direction of the shafts 5 and 6, which is the X direction, parallel to the surface to be printed P, by moving the carriage driving cord 13 through the driving wheel 11. On the contrary, the sheet of paper 3 is forwarded in the Y direction, which is perpendicular to the X direction, by a sheet forwarding roller 14. Desired printing etc. are effected by combining these movements in the X and Y directions.

On the other hand, on the carriage 7 are disposed four pen chuck mechanisms 8, 8, 8, 8 on both the sides of the shafts 5 and 6 in the Y direction arranged two by two. Each of these pen chuck mechanisms 8 consists of a sleeve 16 having a cylindrical shape mounted freely movably forward and backward up and down in the direction perpendicular to the surface to be printed P in a sleeve guide 15 on the carriage 7 and a plurality (three in this embodiment) of holding nails 17, 17, 17 disposed with a constant interval in the peripheral direction on the inner surface of the sleeve 16. The sleeve 16 and these holding nails 17 are made of a synthetic resin, etc. in one body. The sleeve 16 is always energized upward by a compression spring 18 inserted between the lower extremity of the sleeve 16 and the bottom plate 7a of the carriage 7 in such a direction that it is made more distant from the surface to be printed P, and it is stopped by bringing its upper extremity into contact with an upper stopper 15a of the sleeve guide 15. The holding nails 17 hold elastically a pen 19 inserted in the space surrounded by them. In this embodiment the holding nails 17 are so formed that they hold a pen sold in the market as the pen 19. Since the cross section of most of pens sold in the market is hexagonal or circular, in order to hold satisfactorily both of them, the number of the holding nails is preferably 3 or 6 as in this embodiment. The holding nails 17 are long in the up and down direction and convex towards the outside. Further, in order to hold the pen 19 elastically, they are so formed that the inner diameter of the circle formed by the holding nails 17 is smaller than the outer diameter of the pen 19, as indicated by two-dot-one-dashed lines in FIG. 3, in the free state where no pen 19 is held by them. In addition, in order to effect surely centering of the nib 19a of the pen 19 in a simple manner and to hold surely the pen 19, which is usually a pen sold in the market tapered in the most case more and more slender towards the nib 19a, with a sufficient force, the elastic force of each of the holding nails is stronger at the lower extremity, which is closer to the nib 19a than the other, than at the upper extremity. In order to increase the elastic force holding the pen 19 by means of the holding nails 17, it is preferable to dispose an elastic auxiliary member 20 consisting of e.g. a gum band, a spring, etc. round the periphery at an arbitrary position in the proximity of the upper extremity of the holding nails 17, as indicated in FIG. 3. A pen position regulating mechanism 21 is disposed in each of the pen chuck mechanism 8. This pen position regulating mechanism 21 makes the holding nails 17 hold the pen 19 so that the nib 19a thereof is at the mounting reference position projecting over a predetermined distance from the sleeve 16, i.e. that it is located at a predetermined height H from the surface to be printed P, in order to obtain always excellent printing. For this reason, in this pen position regulating mechanism 21, a projection 23 is disposed on the outside of the sleeve 16 towards the slider 9 and a positioning stopper 24 is disposed on the slider 9, which stopper 24 stops the descent of the sleeve 16 by the fact that the descending projection 23 is brought into contact therewith, as an example of the simultaneous displacement distance regulating member for regulating the distance over which the pen chuck mechanism 8 moves towards the surface to be printed P together with the pen 19. Furthermore, as an example of the separate displacement distance regulating member for regulating the distance over which the pen 19 can move alone further towards the surface to be printed P, after the pen chuck mechanism 8 has been stopped, the surface to be printed P is disposed to stop the descent of the pen 19 by the fact that the nib 19a is brought into contact therewith. As indicated in FIG. 3, they are so disposed that the distance H between the lower surface of the projection 23, when the sleeve 16 is stopped at the uppermost position, and the upper surface of the positioning stopper 24 is equal to the height H of the nib 19a of the pen 19 at that time measured from the surface to be printed P. The projections 23, 23, 8, 8 disposed projectingly from each of the four sleeves 16 are arranged with positional intervals in the axial direction of the shafts 5 and 6. This position in the axial direction of each of the projections 23 is the driving position, where each of the pen chuck mechanisms 8 is driven together with the pen 19 towards the surface to be printed P. In this embodiment, the driving positions of the four pen chuck mechanisms 8, 8, carriage are represented by A, B, C and D in the order of left-bottom, left-top, right-bottom and right-top.

Further, on the slider 9, which is the other of the two members, are disposed an engaging n.echanism 10, which engages and disengages the slider 9 with and from the carriage 7, and a pen driving mechanism 22 driving the pen 19 held by the pen chuck mechanism 8 towards the surface to be printed P. Both engaging mechanism 10 and pen driving mechanism 22 use a worm 25 supported freely movably at the lower portion of the slider 9 as a driving source. This worm 25 has an oval cross section and is mounted on the rotational shaft 6, which is a kind of serrated shaft, freely slidably in the axial direction. Further, on the slider 9, a center shaft 26 is mounted above the worm 25 in the transverse direction parallel to the Y direction. On this center shaft 26 is mounted freely rotatingly a sector worm gear 27, which is engaged with the worm 25. To one side of this sector worm gear 27 is secured an engaging cam 28, which is one component of the engaging mechanism 10. Further, on the other side surface of the sector worm gear 27 is mounted freely rotatingly a driving cam 26, which is one component of the pen driving mechanism 22, on the center shaft 26.

Figure 6:
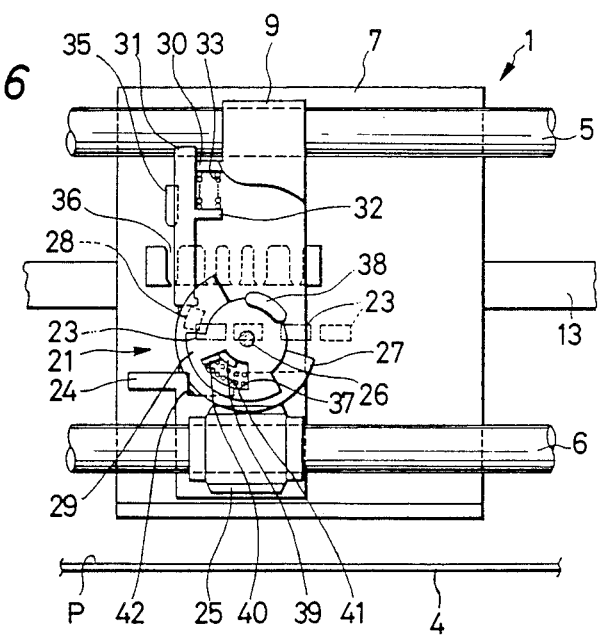
FIGS. 6 and 7 are the same figures as FIG. 5 in a middle stage at the selection and at the printing, respectively, at the driving position A.
Figure 7:
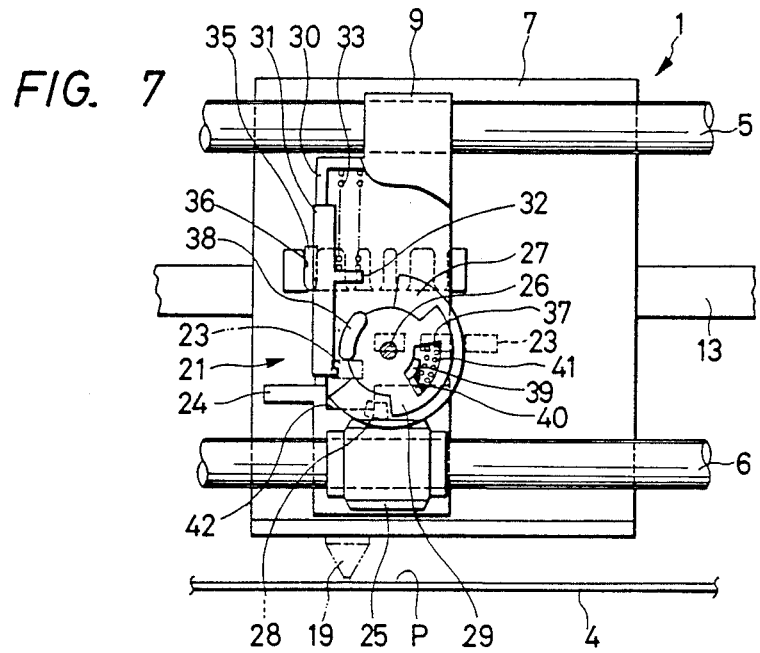
Figure 8:
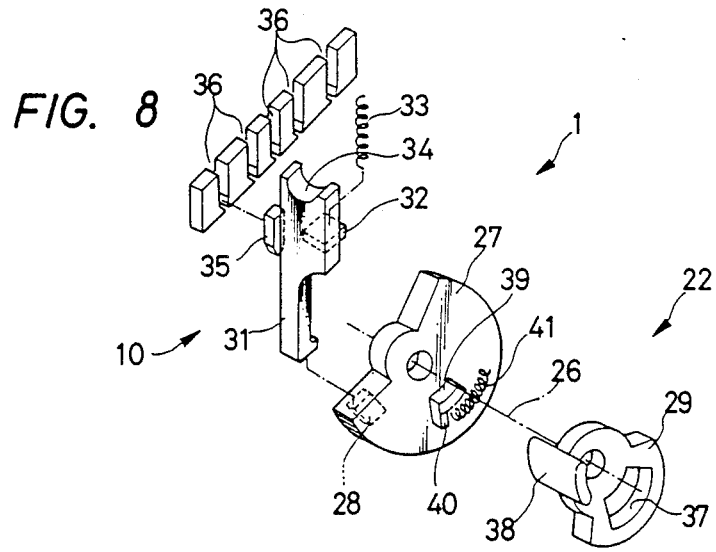
FIG. 8 is an exploded perspective view illustrating the construction of an engaging mechanism, a pen driving mechanism, etc. of the printer indicated in FIG. 1.

This engaging mechanism 10 will be explained below, referring to FIGS. 2 to 8. A lock lever 31 is supported freely movably upward and downward above the engaging cam 28 by a lock lever guide 30 formed on the slider 9. This lock lever 31 is moved up and down by the engaging cam 28 at its lower extremity and energized downward by a compression spring 33 inserted between a spring receiving seat 32 formed on the lock lever 31 and the ceiling portion of the slider 9. Further, on the upper end portion of the lock lever 31 is formed a contacting surface 34 having a semicircular form, which is brought into contact with the outer peripheral surface of the fixed shaft 5. In addition, on the side surface of the lock lever 31 opposite to the sector worm gear 27 is disposed an engaging wedge 35. On the caridge 7 are formed 5 engaging recesses 36, 36, ... opened upward, with and from which this engaging wedge 35 is engaged and disengaged. These 5 engaging recesses 36, 36, 36, 36, 36, except for the engaging recess 36 at the central position in FIG. 8, correspond to the driving positions A, B, C and D described above in the order of left to right. The central engaging recess is used for mounting and dismounting of the pen 19 to and from the pen chuck mechanism 8. As indicated in FIG. 7, in the case where the engaging wedge 35 of the lock lever 35 is engaged with either one of the engaging recesses 36 of the carriage 7, the slider 9 and the caridge 7 move together in one body. Further, as indicated in FIG. 6, in the case where the engaging wedge 35 is disenaged from all of the engaging recesses 36 and the contacting surface 34 of the upper end portion of the lock lever 31 is brought with the lower half portion of the outer peripheral surface of the fixed shaft 5, the slider 9, which is one of the members, is supported fixedly between the two shafts 5 and 6 and at this state the carriage 7, which is the other of the members, moves relatively with respect to the slider 9 by moving in the X direction.

Now the pen driving mechanism 22 will be explained below, referring to FIGS. 2 to 8. The driving cam 29 has an approximately circular form consisting of a larger arc portion and a smaller arc portion connected to each other. In the larger arc portion is formed an arc shaped throughhole 37, whose center is the center shaft 26 and in the smaller arc portion is disposed a pen driving lever 38 driving a projection 23, which is opposite in the Y direction to the slider 9, towards the surface to be printed P on both the sides in Y direction. These pen driving levers 38, 38, ... extend from the cut-off portion of the sector worm gear 27 to both the sides in the Y direction. Further, on the side surface of the sector worm gear 27 on the side surface of the side of the driving cam 29 is disposed projectingly an arc shaped projection 39 having a center angle, which is smaller than the center angle of the arc shaped throughhole 37 and this arc shaped projection 39 is inserted in the arc shaped throughhole 37 so that it can rotate relatively in the extent of the difference between the two center angles. In the arc shaped throughhole 37 of driving cam 29 is inserted a compression spring 41 between a spring receiving seat 40 projectingly disposed on the sector worm gear 27 and the end surface of the arc shaped throughhole 37, which spring gives the sector worm gear 27 and the driving cam 29 a force rotating them in the directions opposite to each other. This compression spring 41 brings, as indicated in FIG. 6, the clockwise end surface of the arc shaped throughhole 37 and that of the arc shaped projection 39 into contact with each other, in the case where the nib 19a of the pen 19 is not elastically thrust against the surface to be printed P. Further, in the positioning stopper 24 disposed on both sides of the Y direction of the slider 9 is formed a refuge recess portion 42 so that, in the case where the nib 19a of the pen 19 is brought into contact with the surface to be printed P in order to effect printing etc., the projection 23 disposed projectingly on the sleeve 16 in each of the pen chuck mechanisms 8 descends below the upper surface of the positioning stopper 24.

Figure 10:
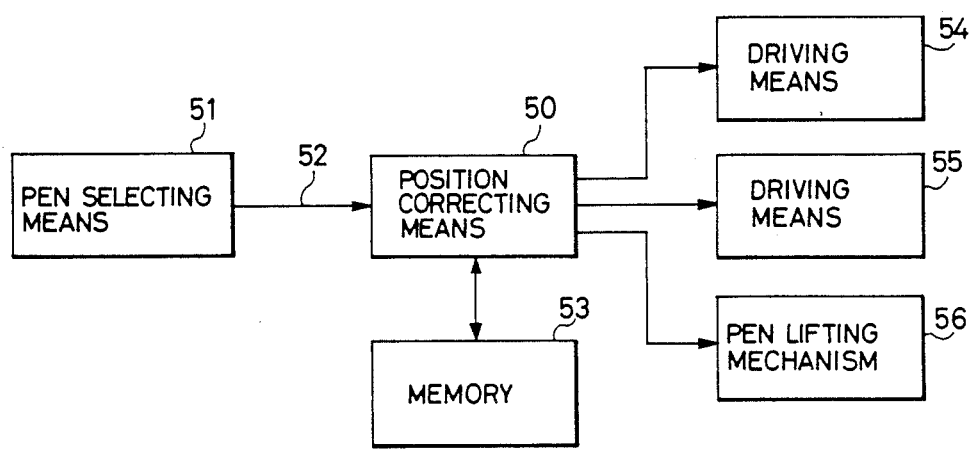
FIG. 10 is a block diagram showing the construction of a control unit.

Now, as indicated in FIG. 1 in detail, on the carriage 7 described above are formed four pen chuck mechanisms 8 in total, two longitudinal and two transverse, at positions corresponding to the four apices of a rectangle on a plane. The interval between two of the pens 19A, 19B, 19C and 19D mounted on each of the pen chuck mechanism 8 is a in the X direction and b in the Y direction. Printing is begun, after specified pens 19 have been positioned at their predetermined initial positions. For this reason, it is necessary to regulate operation while moving the carriage 7 in the X direction and at the same time to regulate operation while moving the sheet of paper 3 in the Y direction. Position correcting means 50 therefor is disposed, as indicated in FIG. 10. The position correcting means 50 is connected electrically with pen selecting means 51 for selecting a pen which is to be used for printing so that a selection signal 52 for a specified pen 19 selected by this pen selecting means 51 is output from the pen selecting means 51 to the position correcting means 50. Further this position correcting means 50 is provided with a memory 53 for storing change-over strokes for changing-over pens 19 and in this memory 53 is formed a table representing the changing-over strokes divided into two groups, one relating to the X direction and the other to the Y direction as shown in Table 1.

TABLE 1

| Pen change-over | X direction | Y direction |
| --- | --- | --- |
| 19A → 19B | +a | 0 |
| 19A → 19C | 0 | +b |
| 19A → 19D | +a | +b |
| 19B → 19A | −a | 0 |
| 19B → 19C | −a | +b |
| 19B → 19D | 0 | +b |
| 19C → 19A | 0 | −b |
| 19C → 19B | +a | −b |
| 19C → 19D | +a | 0 |
| 19D → 19A | −a | −b |
| 19D → 19B | 0 | −b |
| 19D → 19C | −a | 0 |

Furthermore the position correcting means 50 described above is connected electrically with the means 54 for driving the sheet of paper 3 and the means 55 for driving the carriage 7 so as to be able to drive at least one of the sheet of paper 3 and the carriage 7 by the stroke according to Table 1. In addition the position correcting means 50 described above is connected electrically also with a lifting means 56 for raising and lowering each of the pens 19 mounted on the pen chuck mechanism 8 in the carriage 7.

Now the operation of this embodiment will be explained below.

At first the mounting of the pen 19 on each of the pen chuck mechanisms 8 is effected in the state where the engaging wedge 35 projectingly disposed on the lock lever 31 is engaged with the engaging recess 36 at the central position in the X direction formed in the carriage 7. In this case the positioning stopper 24 is under the projection 23 on each of the pen chuck mechanisms 8. The mounting of the pens 19 on the pen chuck mechanisms 8 is explained for one pen chuck mechanism 8. Through the opening formed in the proximity of the upper stopper 15a of the sleeve guide 15 disposed on the carriage 7 the nib 19a of a pen 19 is thrust towards the surface to be printed P in the space surrounded by the holding nails 17 within the sleeve guide 15 so as to insert it therein. This pen 19 is inserted downward therein while thrusting the holding nails 17 outward against their elastic force. When the pen 19 is inserted to some extent, the frictional force between the pen 19 and each of the holding nails 17 becomes stronger than the elastic force of the compression spring 18 and the sleeve 16 begins to descend against the elastic force of the compression spring 18. After that the descent of the sleeve 16 and the holding nails 17 is stopped physically by the fact that the projection 23 projectingly disposed on the sleeve 16 is brought into contact with the positioning stopper 24. Then, when the pen 19 is further thrust, the pen is further inserted while thrusting outward the holding nails 17, the descent of the nib 19a of the pen 19 is stopped physically by the fact that it is brought into contact with the surface to be printed P. In this state, when the thrusting force on the pen 19 is removed, the sleeve 16, the holding nails 17 and the pen 19 are raised all together by the resilient force of the compression spring 18 and they are stopped at their highest position by the fact that the upper end surface of the sleeve 16 is brought into contact with the upper stopper 15a of the sleeve guide 15. At this time the nib 19a of the pen 19 is positioned at the mounting reference position protruding from the lower extremity of the sleeve 16 over a predetermined distance and at the same time at a position, which is higher than the surface to be printed P by a predetermined height H. In this way a pen 19 having an arbitrary shape is mounted so that its nib 19a is always in accordance with a constant mounting reference position and following printing etc. its movement can be effected satisfactorily. Further the pen 19 is held elastically by the holding nails 17. In addition centering of the nib 19a can be performed correctly by the fact that the elastic force in the lower end portion of the holding nails 17 is stronger than that in the upper end portion and at the same time, even if the extremity of the pen is tapered so as to be more and more slender, it can be held with a sufficient holding force. As explained above, by using the pen chuck mechanisms 8 of this embodiment it is possible to hold various pens having an arbitrary thickness, length and shape by an extremely simple operation, while performing the centering of the nib 19a correctly. Thus printing etc. can be effected arbitrarily with a pen sold in the market and it is possible also to select the color and the property of the ink, the size of printed letters, etc.

Next the pen 19 to be used for printing etc. is selected. This operation for selecting the pen 19 is identical to the operation for changing-over the pen 19 used for printing etc.

Now suppose that the pen 19, which is at the left bottom in FIG. 1, is selected. At first, starting from the state indicated in FIG. 5, the rotational shaft 6 and the worm 25 are rotated by means of a driving motor not shown in the figure so that the sector worm gear 27 is rotated clockwise in the same figure. In this way the engaging cam 28 is rotated clockwise in the same figure together with the sector worm gear 27 and the lock lever 31 is raised by the engaging cam 28 against the elastic force of the compression spring 33. As this lock lever 31 is raised, the engaging wedge 35 is separated upward from the engaging recess 36 formed in the carriage 7 and the carriage 7 and the slider 9 are in the state where they are freely relatively movable. Then, when the lock lever 31 is further raised, the rotation of the rotational shaft 6 is stopped in the state where the contacting surface 34 of the upper end portion is contacted strongly with the lower half surface of the fixed shaft 5. In this way the slider 9 is fixed by the fact that the lock lever 31, the engaging cam 28, the sector worm gear 27 and the worm 25 are strongly stretched between the two shafts 5 and 6. Then only the carriage 7 is displaced towards right right by driving the caridge driving cord 13 through the driving wheel 11 and when the slider 9 reaches the driving position A, the displacement of the carriage 7 towards the right is stopped. This state is represented in FIG. 6. After that, the rotational shaft 6 is rotated inversely, which rotates the sector worm gear 27 counterckockwise in FIG. 6 through the worm 25 and lowers the lock lever 31 by the resilient force of the compression spring 33 so as to follow the engaging cam 28 so that the engaging wedge 35 is engaged with the engaging recess 36 at the left end in FIG. 6 corresponding to the driving position A. When this engaging wedge 35 and the engaging recess 36 are perfectly engaged with each other, the descent of the engaging wedge 35 is prevented by the engaging recess 36 and the selection of the pen 19 is terminated. The carriage 7 and the slider 6 are united in one body by this engagement of the engaging wedge with the engaging recess 36 and displaced thereafter together in the X direction by the driving wheel 11. At the selected driving position A in FIG. 6, just under the projection 23 a refuge recess 42 formed in the positioning stopper 24 is opposed thereto, which enables the pen 19 to decsend.

Next for effecting printing etc. the sector worm gear 27 is further rotated counterclockwise in FIG. 6 by rotating further the rotational shaft 6. The rotational force of this sector worm gear 27 is transmitted to the driving cam 29 through the compression spring 41 and the driving cam 29 rotates also counterclockwise in the same figure together with the pen driving lever 38. This pen driving lever 38 is brought into contact with the projection 23 projectingly disposed on the sleeve 16 in the pen chuck mechanism 8, while rotating counterclockwise, which lowers the pen 19 together with the sleeve 16 towards the surface to be printed P. As the rotation of the pen driving lever 38 progresses, the nib 19a of the pen 19 is brought into contact with the surface to be printed P. Although, in this state, the rotation of the driving cam 29 is prevented, further in this embodiment only the sector worm gear 27 is rotated in the same direction and as indicated in FIG. 7, disengages the arc shaped projection 39 of the sector worm gear 27 from the clockwise end surface of the arc shaped throughhole 37 formed in the driving cam 29, which brings elastically the nib 19a of the pen 19 into contact with the sheet of paper 3 through the elastic force of the compression spring 41. Since the nib 19a of the pen 19 is brought elastically into contact with the sheet of paper 3, this contacting state between the nib 19a and the sheet of paper 3 absorbs fabrication errors of each of the components of the printer, mounting errors of the pen 19 on the pen chuck mechanism 8, differences in the thickness of the sheet of paper 3 and unevenness of the sheet of paper 3 so that the nib 19a is brought into contact with the sheet of paper 3 always with a constant contacting pressure and therefore extremely good printing can be obtained. In practice, in the state where the nib 19a of the pen 19 is brought into contact with the sheet of paper 3, printing etc. is performed according to printing instructions on the sheet of paper 3, while moving the carriage 7 and the slider 9 in the X direction and the sheet of paper 3 in the Y direction.

Next for changing-over the pen 19, which is used to perform printing etc., the nib 19a of the pen 19 is separated from the sheet of paper 3 by rotating the rotational shaft 6 so as to rotate the sector worm gear 27 clockwise in FIG. 7 and a following new pen is selected in the same way as for the selection of the pen 19. Thereafter printing etc. are effected by means of the new pen 19 in the same way as described previously.

As explained above, according to this embodiment, the exchange of the pen 19 can be effected extremely simply. Further the construction of the printer is also simple and it is cheap.

Figure 9:
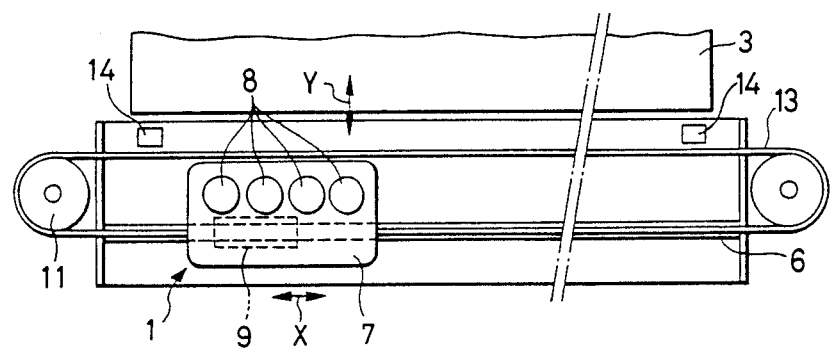
FIG. 9 is a plan view similar to FIG. 1, indicating a second embodiment of this invention.

FIG. 9 shows another embodiment of this invention.

In this embodiment four pen chuck mechanisms 8, 8, 8, 8 are arranged on one straight line in the X direction and the other parts of the construction are identical to that indicated in the preceding embodiment. By arranging the pen chuck mechanisms 8 as described in this embodiment it is possible to enlarge the extent where printing etc. can be effected in the Y direction with respect to the sheet of paper 3, by using all these four pens 19, 19, 19, 19.

Furthermore, when the number of pens 19 arranged in the X direction is reduced as described in the preceding embodiment, it is possible to enlarge the extent where printing etc. can be effected in the X direction with respect to the sheet of paper 3, by using all these pens 19, 19, 19, 19.

Consequently, in the setting of the extent where printing etc. can be effected by means of all the pens 19, 19, 19, 19, the arrangement of the pens 19 in the X and Y directions may be determined according to the content of the printing etc. which the printer should perform.

Since the pen type printer mechanism is constructed as explained above, various pens having different thicknesses, lengths and forms can be held, while effecting the centering of the nib correctly and it is possible to effect printing etc. always with a suitable pressure. Furthermore effects can be obtained that the pen, which is used for the printing etc., can be changed-over easily and that the printer has a simple construction and it is cheap. In addition, according to the printing method by means of a pen type printer according to this invention an effect can be obtained that a desired printing can be effected by positioning each of a plurality of pens at its initial position predetermined therefor.

While particular embodiments of the invention have been shown and described, it will be obvious to those skilled in the art that various changes and modifications may be made without departing from the present invention in its broader aspects.

The embodiments of the invention in which an exclusive property or privilege is claimed are defined as follows:

1. A pen selection mechanism for a pen type printer, comprising:
- a carriage movable in a plane parallel to a surface to be printed;
- a plurality of pen chuck mechanisms supported by said carriage, each movable in a direction perpendicular to said surface to be printed together with pens held thereon;
- a slider mounted movably with respect to said carriage between a plurality of driving positions corresponding to said pen chuck mechanisms and engaged with said carriage at each of said driving positions;
- a pen driving mechanism disposed on said slider and capable of driving at each of the driving positions a corresponding one of said pen chuck mechanisms in the direction perpendicular to said surface;
- an engagement mechanism disposed on said slider and capable of engaging said slider with said carriage and disengaging said slider from said carriage; and
- a single drive source disposed on said slider for driving both said pen driving mechanism and said engagement mechanism.

* * * * *